Jan. 15, 1924.                J. L. LUCE ET AL                1,481,138
                                RESILIENT WHEEL
                              Filed March 7, 1923
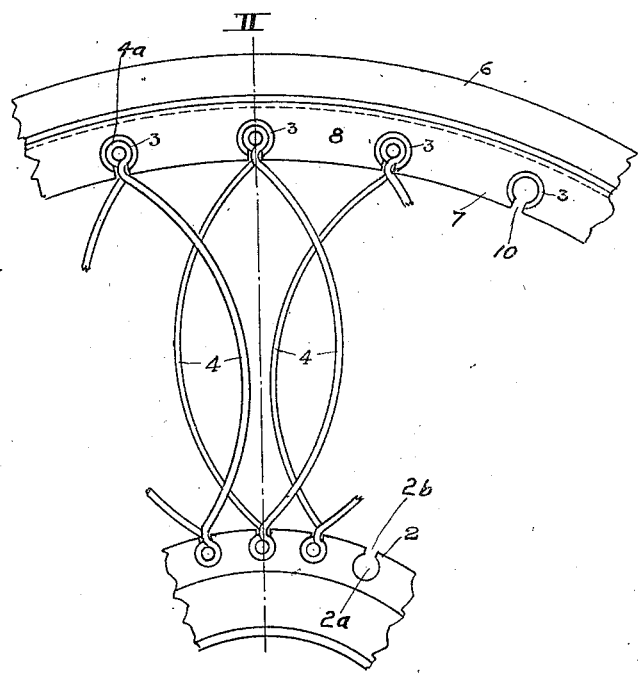
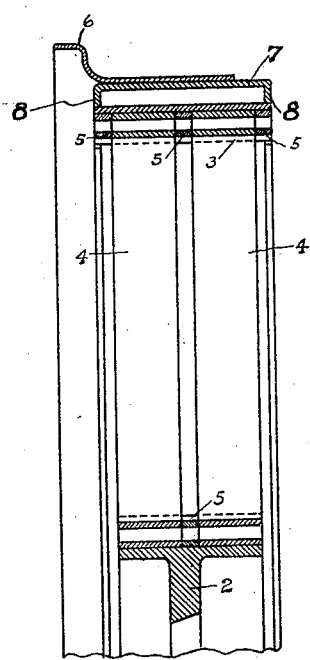
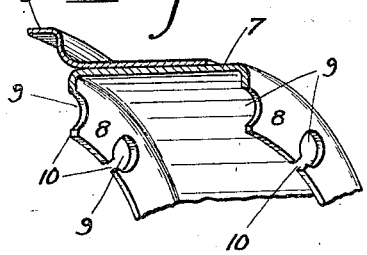
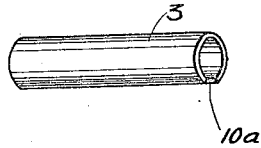
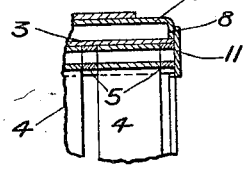
Inventors
Joseph L. Luce
Raymond P. Luce
by C. M. Clarke atty.

Patented Jan. 15, 1924.

1,481,138

UNITED STATES PATENT OFFICE.

JOSEPH L. LUCE AND RAYMOND P. LUCE, OF BELLE VERNON, PENNSYLVANIA.

RESILIENT WHEEL.

Application filed March 7, 1923. Serial No. 623,363.

*To all whom it may concern:*

Be it known that we, JOSEPH L. LUCE and RAYMOND P. LUCE, citizens of the United States, residing at Belle Vernon, in the county of Fayette and State of Pennsylvania, have invented certain new and useful Improvements in Resilient Wheels, of which the following is a specification.

Our invention relates to improvements in resilient wheels for use with automobiles, aeroplanes, or other vehicles, and has for its object to provide a simple and efficient construction in the manner hereinafter described.

The principal object in view is to construct a simple and substantial resilient wheel of economical cost, capable of absorbing the usual shocks of impact and use, utilizing flexible spring spokes to provide for yielding movement of the hub with relation to the rim or tire, either with or without a resilient shoe, as preferred.

The invention is an improvement in that class of resilient wheels disclosed in patent of Bohannon No. 1,345,827 of July 6, 1920.

The principal objects in view herein are to provide for simple and efficient connection between the outer terminals of the resilient spokes and the rim member, by use of a slotted bearing sleeve construction, adapted to be incorporated with the rim member and to provide an intervening bearing therein for the spoke terminals.

In the drawings, illustrating one preferred embodiment of the invention,

Fig. 1 is a partial view of a wheel in side elevation, constructed according to our invention;

Fig. 2 is a cross section thereof on the line II—II of Fig. 1;

Fig. 3 is a detail sectional view in perspective, showing a portion of the rim member;

Fig. 4 is a similar view, showing the slotted bearing tube detached; and

Fig. 5 is a sectional detail view showing a retaining plate for the mounting members.

In the drawings, the hub member 2, which may be of any suitable construction, is provided with an annular series of sockets $2^a$, extending transversely across and around the periphery of the hub, each having outwardly or radially disposed openings $2^b$, for insertion and clearance of the inner body portion of the spokes 4.

The rim 7, as shown, is of channel form in cross section, with the flanges 8 extending inwardly and providing mounting supports for the outer ends of the spokes 4. Any suitable rim construction 6 may be attached to the outer portion of the main rim member, as will be readily understood.

The flanges 8 of the main rim member 7 are provided with oppositely located circular openings 9, inwardly apertured for clearance of the spokes, as at 10, openings 9 constituting equally spaced pairs around the entire rim member, through the flanges thereof, and radially corresponding to the hub sockets $2^a$.

For the purpose of providing a continuous bearing member for the outer rounded end portions of the spokes, a tube 3 is tightly fitted within each pair of openings 9, and secured therein by brazing, riveting, welding, or otherwise. Each such tube 3 is provided with an inwardly opening clearance space $10^a$ corresponding to clearance 10, for the spokes 4. The outer rounded ends $4^a$ of the spokes snugly interfit within the cavity of the tube 3, at one side and the other, as in Fig. 2, providing bearings for each oppositely bowed spoke 4, forming members of each associated pair of spokes. The width of the spokes, as shown, is less than the entire width of the rim, and the spokes are spaced apart at the middle and inwardly from each outer edge, which space is occupied by the several thimbles or washer members 5—5—5.

The outermost of such thimbles 5 are secured in position by any suitable means, as by riveting over the ends of tubes 3, whereby to fixedly locate the spokes in position and prevent their accidental removal. Alternatively, a plate 11 may be laid over the outermost faces of the flange members 8, and screwed thereon, retaining the spokes in the same manner, as in Fig. 5.

As thus constructed, the entire series of spokes 4 are mounted in the hub member and also the rim member in such a manner as to provide for ample latitude of motion in action, with the slight rotation of the cylindrical spoke terminals, and especially in the rim member where the spoke terminals are mounted within the cylindrical interior of the tubes 3. By the use of such tubes, there is provided, not only a snug embracing engagement with the outer ends of the spoke members, but the further advantage of providing continuous even bearing for the full width of each spoke member is secured.

A further advantage is in the ease with which the construction adapts itself to the application and retention of a suitable lubricant, while at the same time being capable of easy removal and insertion of the spoke members from either side, in case of breakage and necessary renewal.

The construction, operation and advantages of the invention will be readily appreciated from the foregoing description. The construction admits of the use of spokes of the kind disclosed, of standard sizes as to spokes and tubes; any desired arrangement of the cavities depending on the capacity of the wheel and the load to be carried; and the construction avoids the necessity of transverse securing bolts or rivets, or of additional supplemental parts.

The number, arrangement, size and design of the various members of the wheel may be changed by the skilled mechanic to adapt the improvement to varying conditions of use, and all such changes are to be considered as within the scope of the following claims.

What we claim is:

1. In a resilient wheel of the character described, the combination with a socketed hub, of an outer annular rim having inwardly extending flanges each provided with annular series of inwardly open circular sockets, inwardly open cylindrical bearing thimbles in said sockets, and corresponding series of spokes having rounded terminals seated in said thimbles.

2. In a resilient wheel of the character described, the combination with a socketed hub, of an outer annular rim having inwardly extending flanges each provided with annular series of inwardly open circular sockets, inwardly open cylindrical bearing thimbles in said sockets, and corresponding series of spokes having rounded terminals seated in said thimbles and provided with spacing and securing members.

3. The combination with a channel shaped annular rim having its inwardly extending flanges provided with annular series of oppositely located inwardly open circular sockets, cylindrical bearing thimbles having inwardly disposed longitudinal slots mounted by their ends in said sockets, and a series of flat metal spokes having their ends bent into cylindrical terminals and seated within the several thimbles with the flat spoke extending through the thimble slots and in register with the inwardly open clearance portions of the rim flanges.

4. The combination with a channel shaped annular rim having its inwardly extending flanges provided with annular series of oppositely located inwardly open circular sockets, cylindrical bearing thimbles having inwardly disposed longitudinal slots mounted by their ends in said sockets, a series of flat metal spokes having their ends bent into cylindrical terminals and seated within the several thimbles with the flat spoke extending through the thimble slots and in register with the inwardly open clearance portions of the rim flanges, and holding devices on the flanges engaging the ends of the bearing thimbles preventing endwise movement thereof.

In testimony whereof we hereunto affix our signatures.

JOSEPH L. LUCE.
RAYMOND P. LUCE.

Witness:
ALICE A. TRILL.